F. KOCH.
REVERSIBLE PLOW.
APPLICATION FILED SEPT. 29, 1910.
1,002,283.
Patented Sept. 5, 1911.
2 SHEETS—SHEET 1.
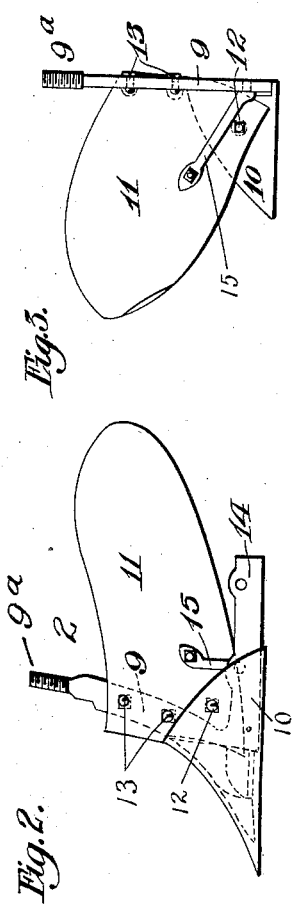
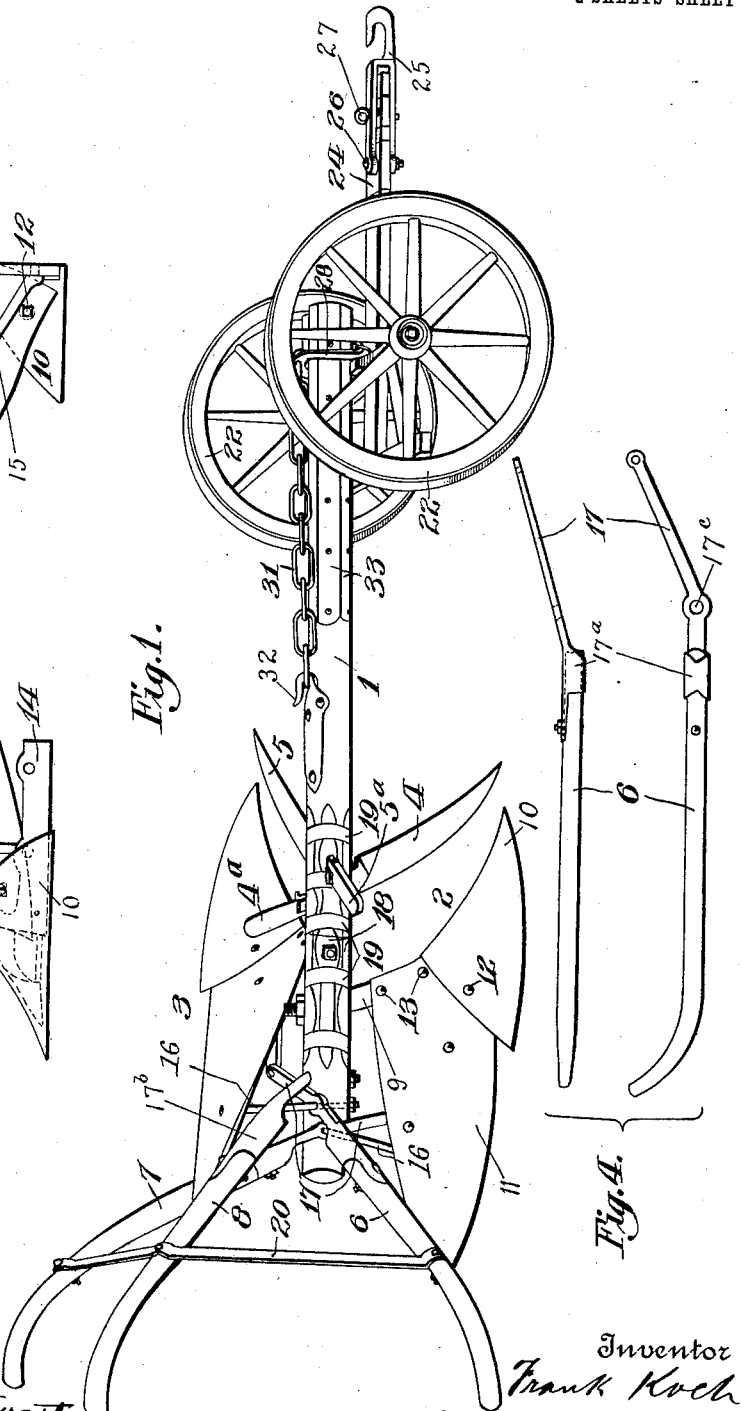

F. KOCH.
REVERSIBLE PLOW.
APPLICATION FILED SEPT. 29, 1910.
1,002,283.
Patented Sept. 5, 1911.
2 SHEETS—SHEET 2.
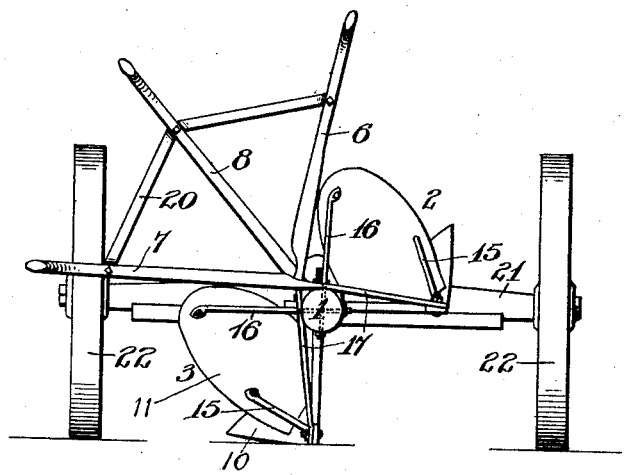
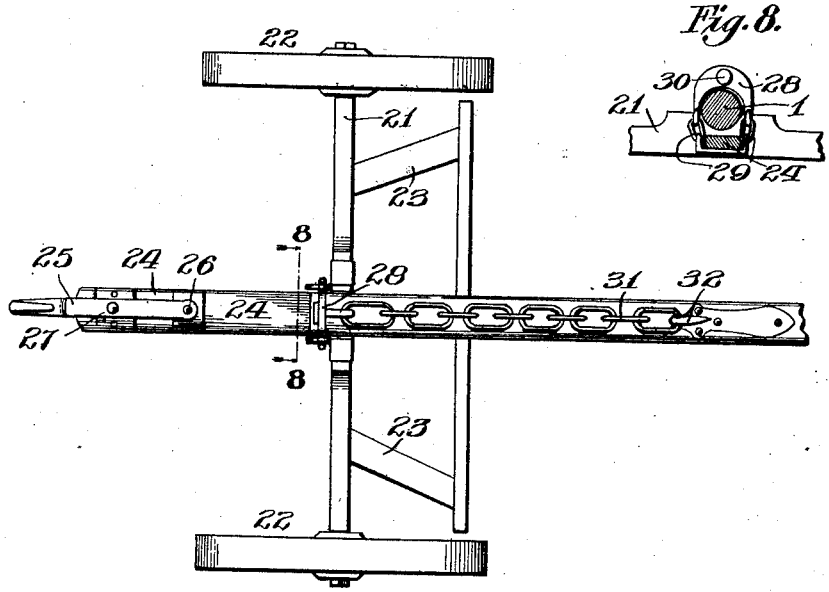
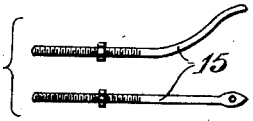
Witnesses
Donald H. Stewart.
E. V. Webster
Inventor
Frank Koch
By Dowell & Dowell
his Attorneys.

UNITED STATES PATENT OFFICE.

FRANK KOCH, OF SAGINAW, MICHIGAN.

REVERSIBLE PLOW.

1,002,283.    Specification of Letters Patent.    Patented Sept. 5, 1911.

Application filed September 29, 1910. Serial No. 584,427.

*To all whom it may concern:*

Be it known that I, FRANK KOCH, a citizen of the United States, residing at Saginaw, in the county of Saginaw and State of Michigan, have invented certain new and useful Improvements in Reversible Plows, of which the following is a specification.

My invention relates to an implement having right and left hand plows disposed at an angle to one another and affixed to the same beam which can be turned on its own axis to bring either plow into operative position while the other is carried inoperatively above the ground.

The object of the invention is to provide a simple, practical and efficient implement of the above-stated character, which will be conveniently adapted for back and forth plowing, on small farms.

The invention consists of the construction hereinafter described with reference to the accompanying drawings and particularly pointed out in the claims annexed to this specification.

In said drawings: Figure 1 is a perspective side view of an implement embodying my invention. Fig. 2 is a land side view of the right hand plow. Fig. 3 is a rear elevation of the same. Fig. 4 comprises a plan and side elevation of one of the lateral handles and the brace supporting the same. Fig. 5 is a rear view of the implement. Fig. 6 is a plan view of the front or draft portion of the implement. Fig. 7 comprises a front and side elevation of one of the brace rods used in the construction of the implement. Fig. 8 is a section on line 8—8 of Fig. 6, looking in the direction of the arrow.

A description of the illustrated construction is as follows:

The beam 1 has affixed thereto the individual right and left hand plows 2 and 3, together with knives 4 and 5 in advance of the respective plows; and three handle-bars 6, 7 and 8, two of which serve as the handles for either plow.

The plows are disposed with their land sides at substantially right angles to one another, and the lateral or right and left hand handle-bars are arranged at approximately a similar angle, more or less; the middle handle-bar 8 being midway between the other two and also bisecting the angle between the plows; so that the right hand handle-bar rises from the land side of the left hand plow, and the left hand handle-bar rises from the corresponding side of the right hand plow.

The individual construction of either plow is as follows: It comprises a share 10 and moldboard 11 attached to a standard 9, the upper end of which is fastened in a socket therefor in the beam. Preferably the share laps over the front lower edge of the moldboard, to which it is attached by a bolt 12, while the front or cutting edge of the moldboard is fastened to the standard by two bent or angular bolts 13. Said standard has a trailing foot 14, which is or may be formed to provide a landside extending rearwardly of the landside face of the share. The foot or land side 14 is braced or connected to the under side of the moldboard by a bent rod 15 shown in detail in Fig. 7; and the heel of said foot 14 is braced or connected to the rear end of the beam by a stout brace rod 17 having at its upper end a socket $17^a$ for the corresponding handle-bar, 6 or 7, as the case may be. Thus the outer handle-bars 6 and 7 are practically prolongations of said brace rods 17, and hence the handle-bars may be considered as attached directly to the rear end of the beam and to the heels of the landsides of the respective plows. The intermediate handle 8 is connected to the beam by a brace $17^b$ rising from the beam and provided at its upper end with a socket to receive the end of the handle, the said brace being inserted through the beam and secured by a nut on its lower end, while the braces 17 are provided with openings $17^c$ through which securing screws are inserted into the end of the beam. These securing screws are elongated and take the form of brace rods 16 having their outer ends secured to the rear portions of the moldboards, thereby connecting the beam and the moldboards.

Both plow standards 9 have their upper ends reduced to form bolt-like shanks $9^a$ and the knives 4 and 5 have reduced shanks $4^a$ and $5^a$ at their upper ends; the said shanks being inserted through holes provided therefor in the beam and secured by fastening nuts and wedges as shown in Fig. 1. That portion of the beam where such shanks are inserted may be strengthened, if the beam is of wood, by longitudinal metal plates 18 secured upon the beam by shrunk metal rings or collars 19.

The three handle-bars are braced together by an angular brace bar 20 secured centrally to the middle handle-bar and having its legs secured to the respective outer handle-bars. The front end of the beam is supported upon the axle 21 by guiding and supporting wheels 22, which axle is braced or strengthened by hounds 23, similarly to the front axle tree of an ordinary farm wagon. From the hounds and axle there extends a short tongue 24 having at its front end a hook 25 for attachment of the whiffle tree for hitching the team to the implement. The hook 25, pivoted at 26, is laterally adjustable by means of the bolt 27 adapted to engage one of a number of bolt holes at the front of the tongue for the purpose of landing the working plow, whatever one may be in operative position, or regulating the width of the furrow. The beam is attached to the axle 21 in the manner shown in Figs. 1, 6, and 8, that is a hook or stirrup 28 straddles the beam, and has its lower ends hooked and engaging eyes 29 attached to the axle on opposite sides of the tongue 24. Said hook at its top, is attached at 30 to a draft chain 31 the rear end of which engages the hook 32 on the beam. Thus the front end of the beam simply rests upon the axle and the implement is hauled by the wheels through the said draft chain 31. By lengthening or shortening said chain, and thereby correspondingly depressing or limiting the front end of the beam, the depth of the furrow may be regulated. The front portion of the beam, which is adjustable through the yoke, as the draft chain is lengthened or shortened, may be provided with wear plates 33.

As will be obvious the implement is reversed from the right hand to the left hand plow, or vice versa, simply by turning the beam on its own axis. Thus, looking at Fig. 5, it will be seen that by turning the beam through an angle of 45° to the right, the right hand plow will be brought into operative position, and the handles 7 and 8 will be brought up to take the place of the handles 6 and 8.

I thus provide a simple, practical, efficient implement of the character described for use on ordinary farms and by means of which the soil may be tilled by plowing back and forth, one furrow adjacent to another.

Having described my invention what I claim as new and desire to secure by Letters Patent is:

1. In a plow, the combination of a rotatably mounted beam, two plow shares secured rigidly to the beam and having their landsides at a right angle to each other, braces extending from the landsides past the beam and secured rigidly to the beam and having sockets on their ends adjacent the beam, handles fitted in said sockets, and a brace extending between the handles.

2. In a plow, the combination of a rotatably mounted beam, two plow shares secured rigidly to the beam and having their landsides at a right angle to each other, braces extending from the landsides past the beam and having sockets on their ends adjacent the beam, handles fitted in said sockets, a brace extending between the handles, and braces extending from the moldboards and through the beam to secure thereto the braces from the landsides.

In testimony whereof I affix my signature, in presence of two witnesses.

FRANK KOCH.

Witnesses:
WM. B. BAUM,
JOHN P. WEISS.

---

Copies of this patent may be obtained for five cents each, by addressing the "Commissioner of Patents, Washington, D. C."